Nov. 3, 1953
R. A. EDWARDS
2,657,856
NUMBER CONVERTER
Filed Nov. 15, 1949
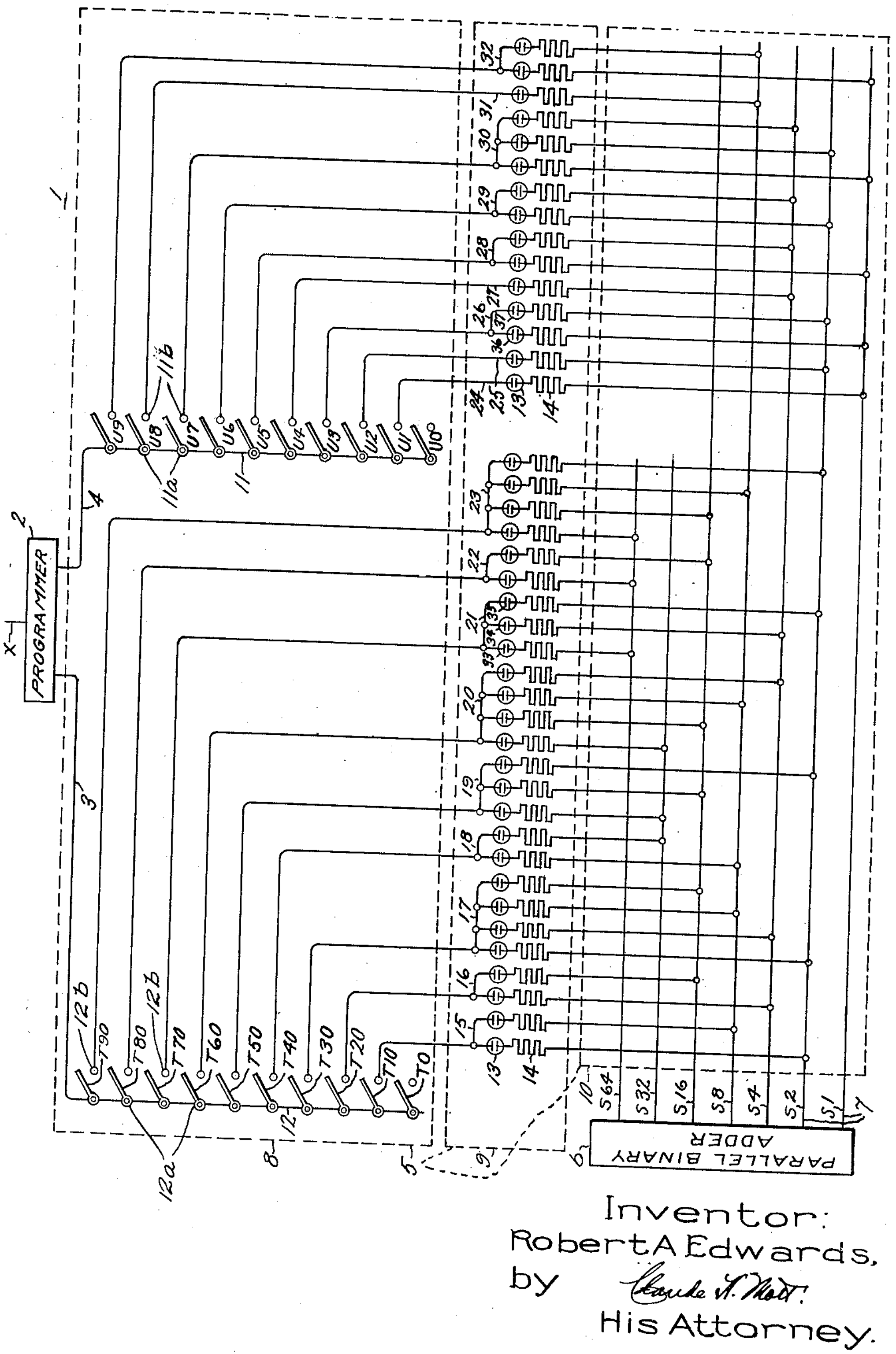
Inventor:
Robert A Edwards,
by [signature]
His Attorney.

Patented Nov. 3, 1953

2,657,856

UNITED STATES PATENT OFFICE 2,657,856

NUMBER CONVERTER

Robert A. Edwards, Schenectady, N. Y., assignor to General Electric Company, a corporation of New York Application November 15, 1949, Serial No. 127,468

6 Claims. (Cl. 235—61)

This invention relates to numbers converters and more particularly to an electric converter capable of converting numbers of one radix to equivalent numbers of a different radix or capable of converting a number to some other predetermined function of that number.

Such a device is particularly useful in calculations involving numbers of different radix, in automatic coding machines, and in automatic calculating machines.

It is an object of this invention to provide an economical, reliable numbers converter for converting a number to a predetermined function of that number.

It is another object of this invention to provide a simple reliable electric converter capable of automatically converting a number of one radix to an equivalent number of a different radix.

A further object is to provide a conversion circuit capable of use with a parallel adder and an electric programmer to convert a number of one radix to its equivalent number in a different radix.

In general, my invention consists of an electric converter comprising a programmer, a conversion circuit and a parallel adder electrically interconnected in a predetermined order to automatically convert a number of one radix to its equivalent number of a different radix.

For a complete understanding of my invention, reference should be had to the following specification and the accompanying drawing in which similar elements are given the same character reference throughout the drawing.

In the drawing, Fig. 1 is a diagrammatic view of an electric converter illustrative of my invention and capable of automatically converting any two digit number of radix 10 to its equivalent number in radix 2.

To understand the mathematics upon which my electric converter is based, assume, for example, that it is desired to convert the decimal number 64 to its equivalent binary form. Such conversion could be numerically accomplished by adding the binary equivalents of 4 and 60. This manipulation is shown below:

| | |
|---|---|
| 4 | 100 |
| +60 | 111100 |
| 64 | 1000000 |

To automatically perform the above operation and similar operations involving the conversion of any two digit number of radix 10 to its equivalent number in radix 2 in accordance with my invention, I provide an electric converter of which the electric converter 1, shown in Fig. 1 of the drawing, is illustrative. The electric converter 1 comprises a conventional electric programmer 2 having two outputs 3 and 4 corresponding to the two digits of the number to be converted, a conversion circuit 5 and a parallel adder 6 having a plurality of inputs 7. The programmer 2 may be any conventional device having an input electrically connected to a grounded source of positive voltage (not shown) and arranged to produce in time sequence a voltage pulse on each of a plurality of outputs, such as 3 and 4. For example, a programmer may comprise a D. C. motor (not shown) arranged to close a plurality of contacts (not shown) in time sequence for one revolution of the motor and by closing the contacts in sequence, exciting the outputs of the programmer in time sequence. The conversion circuit 5 comprises a switching means such as a keyboard 8, a buffer means 9, and a matrix 10. The keyboard 8 comprises a first and second group of selectively operable switches numbered respectively 11 and 12, the number of switches in each group of switches corresponding to the number of characters to be represented in each digit of the number to be converted. For example, the radix of the number to be converted by converter 1 being ten, the number of switches in each group of switches is ten. The first group of switches 11 are arranged to represent by selective operation thereof the units digit of the number to be converted and are therefore numbered U0–U9, as shown in Fig. 1 of the drawing, corresponding to the decimals 0–9. In the same manner, the second group of switches 12 are numbered T0–T90 corresponding to the tens decimal characters 0–90.

The groups of switches 11 and 12 are provided respectively with input terminals 11a and 12a and output terminals 11b and 12b. The input terminals 11a and 12a of the groups of switches 11 and 12 are electrically connected respectively to the outputs 4 and 3 of the programmer 2 to be successively excited thereby in a particular order. For example, the units switches 11 may be excited first and the tens switches 12 later. The output terminals 11b and 12b of the groups of switches 11 and 12 are electrically connected through the buffer means 9 to the matrix 10. Buffer means 9 comprises a plurality of neon tubes 13 and a plurality of associated resistance means 14. The neon tubes 13 and resistors 14 are selectively grouped to form associated groups of neon tubes and resistors numbered 15–32 and electrically connected to the groups of switches 11 and 12 as shown in Fig. 1. The reason for so grouping the neon tubes and resistors will become evident in a description of the matrix 10 to follow. Each of the neon tubes 13 is electrically connected through its associated resistor 14 to a particular output conductor of the matrix 10, the output conductors being numbered S1, S2, S4, S8, S16, S32, and S64 to indicate the decimal sums 1, 2, 4, 8, 16, 32 and 64.

Those skilled in the art will understand that a parallel binary adder, an example of which is disclosed in a publication by the University of Pennsylvania, Moore School of Electrical Engineering, titled "Theory and Techniques for Design of Electronic Digital Computers," volume 3, Lecture 23, may have a plurality of inputs corresponding to the decimals 1, 2, 4, 8, 16, 32, and 64 such that excitation of particular inputs actuates the parallel binary adder to store therein the binary equivalent of the sum of the decimals represented by the input lines. Thus output conductors S1—S64 of the matrix 10 are electrically connected to the inputs 7 of the parallel adder 6 in a predetermined order to store in the adder the binary equivalent of the decimal number corresponding to the particular output conductors S1—S64 energized. For example, when output conductor S64 is energized, the binary equivalent of the decimal 64 is stored in the binary adder 6, and when output conductor S32 is energized the binary equivalent of the decimal 32 is stored in the adder 6.

To follow the operation of the converter 1 as above described, assume, for example, that it is desired to convert the decimal 73 to its equivalent in binary notation. In this operation switch U3 and switch T70 are closed to electrically connect the programmer 2 through its outputs 3 and 4 to the groups of neon tubes 21 and 26. For convenience of description, I have numbered the tubes in group 21 as 33—35 and the tubes in group 26 as 36 and 37. Thereafter, operation of the programmer 2 is initiated by closing an operation switch (not shown) of the programmer to supply the programmer with electric power through the input X and outputs 3 and 4 are thereby energized in a particular order depending upon the arrangement of the programmer. The reason for programing the energization of lines 3 and 4 is to allow sufficient time for the parallel adder to accumulate the information supplied by the energization of one output of the programmer before the other output is energized. Assume that the output 4 is energized first. In this event, neon tubes 36 and 37 are impressed by the programmer with a voltage in the order of 100 volts. The characteristic of neon tubes is such that the tube will not ionize until a voltage of 70 volts is applied to the input of the tube. Until 70 volts is applied thereto the tube acts for practical purposes of this invention as an insulator. After 70 volts is applied, the neon tube ionizes and thereby presents a finite impedance in an electric circuit regardless of additional voltage applied thereto and maintains a finite constant voltage of substantially 50 volts across its terminals. Thus, the voltage output of tubes 36 an 37 is the difference of 100 volts applied to the neon tube and the 50 volts potential drop through the tube.

The outputs of 50 volts each from the tubes 36 and 37 are applied respectively to the matrix output conductors S1 and S2 each through the associated resistors 14 connected to the tubes 36 and 37. Although some voltage drop occurs through the resistors 14, the amount of drop is negligible and therefore substantially 50 volts is applied to the matrix conductors S1 and S2 to actuate the parallel adder 6 and store therein the binary equivalent of the decimal 3. That is, the adder 6 stores the binary equivalent of the decimal 1 in response to 50 volts applied to matrix conductor S1 and further adds the equivalent of the decimal 2 upon application of 50 volts to the matrix conductor S2. After a sufficient time has elapsed for the adder to store the information received from S1 and S2, the programmer then excites output line 3 which through the medium of closed switch T70 applies 100 volts to the group of neon tubes 21 thereby applying 50 volts to matrix conductors S64, S4, and S2. The voltage thus applied to S64, S4 and S2 operates the adder 6 to add the binary equivalents of decimals 64, 4 and 2 to the binary equivalent of 2 plus 1 already stored therein to produce the binary equivalent of the decimal 73. In a similar manner by closing particular ones of the switches U0—U9 and T0—T90 and thereafter operating the programmer 2 any two digit number of radix 10 may be converted by converter 1 to its equivalent binary number. Portions of the circuit (not shown) of the binary adder 6 are grounded to return current supplied to the binary adder 6 from the programmer 2 back to the grounded power source from which input X of the programmer 2 is energized.

To provide for the conversion of radix 10 numbers having more than two digits, it is necessary to add an additional group of switches for each digit increase, provide a programmer with a corresponding number of outputs, and increase the elements of buffer 9, matrix 10 and parallel adder 6 to correspond.

A particular advantage in the use of neon tubes as buffer elements in my invention should be noted at this time. That is, the voltage drop of the neon tubes being substantially constant at 50 volts and neon tubes requiring at least 70 volts to ionize, it is, therefore, impossible for excitation of one of the matrix output conductors to cause a leak-back through a neon tube to another of the matrix output conductors and thereby cause a false addition in the adder. For example, neon tube 35 when ionized applies only 50 volts to conductor S2 with 100 volts applied to the neon tube input. Conductor S2 is electrically connected to conductor S1 through the neon tubes 36 and 37. However, neither tube 36 nor 37 will operate on 50 volts and therefore conductor S1 cannot be energized from conductor S2. In a similar manner, leakage between any of the output conductors S1—S64 is prevented by the inherent characteristics of the neon tubes.

The neon tubes 13 may consist merely of small, inexpensive neon glow lamps which are commonly used as indicator lamps. This is possible because, in the operation of the converter of this invention the voltage characteristics of these neon tubes are not critical. That is, it is not absolutely necessary that conduction begin at exactly 70 volts nor that the normal voltage drop across each conductive tube should be exactly 50 volts. The primary purpose of the glow tubes or glow lamps 13 is to prevent false operation of the numbers converter by unintended energization of output circuits which are necessarily interconnected through unenergized input circuits. For instance, referring back to the above example, in order for output conductor S1 to be energized through energization of output conductor S2 from tube 35, conduction would have to be initiated in the series combination of tubes 35, 36 and 37. This false operation would necessitate an average voltage for initiating conduction in each tube at least as low as 33 volts, since the apparatus is designed with only approximately 100 input volts available. The practical limit of tolerance on the voltage for which the glow tubes or lamps are capable of initiating conduction may therefore go from the nominal 70 volts to as low as 33 volts before false operation of the apparatus is likely to occur.

Thus in accordance with my invention, I provide a simple inexpensive electric converter for converting a number of one radix to its equivalent number in a different radix.

Moreover, by applying neon tubes in my converter, as indicated, a simple inexpensive means is provided for buffering each matrix conductor from other matrix conductors electrically connected to the same buffer group thereby preventing false indications in the parallel adder and insuring reliable operation thereof.

My invention as above described is particularly useful as an incorporated portion of a high speed calculating machine and may also be used wherever a more rapid and accurate conversion is required as compared to manual conversion. If desired, the manually operated keyboard arrangement above described may be replaced by relay operated switches responsive to voltage signals received from a conventional voltage signal producing machine activated in response to a punched tape or card supplying thereto the number information to be converted.

While I have shown and described particular embodiments of my invention, it will be obvious to those skilled in the art that various changes and modifications may be made without departing from my invention in its broader aspects and I, therefore, aim in the broader claims to cover all such changes and modifications as fall within the true spirit and scope of my invention.

What I claim as new and desire to secure by Letters Patent of the United States is:

1. An electric device for converting a number of one radix to its equivalent number of a different radix comprising an electric programmer, a switch means having output terminals electrically connected thereby to said programmer in a predetermined order to be energized thereby, a parallel electric adder, an electric matrix having output conductors electrically connected to said parallel adder in a predetermined order and also having input conductors more than one of which are connected to the same output conductor and means for connecting a predetermined number of said input conductors to different output terminals of said switch means, said means including a plurality of electric buffer means each having in each direction therethrough a non-linear voltage-current characteristic providing for no conduction below a predetermined substantial impressed voltage and for a limited voltage drop relatively independent of impressed voltage during conduction, a single and different one of said electric buffer means being connected in circuit with each of said input conductors to an output terminal of said switch means.

2. An electric device for converting a number of one radix to its equivalent number of a different radix comprising an electric programmer, a switch means electrically connected to said programmer in a predetermined order to be energized thereby, a parallel electric adder, an electric matrix electrically connected to said parallel adder in a predetermined order, and electric buffer means comprising neon tubes and associated resistors electrically connected in a predetermined relation between said matrix and said switch means.

3. An electric device for converting a given number of one radix to its equivalent number of a different radix comprising an electric programmer adapted to successively energize in time sequence a plurality of output conductors thereof corresponding in number to the number of digits of said given number, switch means comprising a plurality of selected groups of associated switch members, the number of said groups corresponding to the number of digits in said given number and the number of said switch members in each group being dependent upon the radix of said given number, an input and an output terminal for each switch member, connections for electrically connecting said input terminals of each group of associated switch members to a particular one of said output conductors of said programmer to successively energize each group of associated switch members in response to operation of said programmer, an electric matrix having a plurality of input conductors and a plurality of output conductors electrically interconnected in a predetermined relation depending upon the radix and number of digits of said given number and the radix of said equivalent number, buffer means electrically connected between different groups of said output conductors of said matrix having at least one output conductor common to two or more groups thereof with each of said output conductors of a group being connected through only one of said buffer means to one of the output terminals of said switch means to apply a predetermined voltage on particular ones of said output conductors of said matrix sequentially in response to selected operation of said switch means and operation of said programmer and to electrically buffer each output conductor of said matrix from associated output conductors thereof electrically connected thereto through said buffer means, and a parallel adder having a plurality of input conductors each electrically connected to an associated output conductor of said matrix.

4. An electric device for converting a given number of one radix to its equivalent number of a different radix comprising an electric programmer having a plurality of ouput conductors corresponding in number to the number of digits of said given number, said programmer being arranged to energize its output conductors in time sequence, an electric matrix having a plurality of output conductors, a plurality of groups of switches, each group associated with and electrically connected to a particular one of said output conductors of said programmer, the number of switches in each group being dependent upon the radix of said given number, a plurality of selected groups of buffer means each group comprising one or more neon tubes and associated resistors, each neon tube being connected in electric series circuit with its associated resistor, each group of buffer means being electrically connected between a particular one of said switches and a particular set of said output conductors of said matrix to provide an electric buffer means between the output conductors of each set of conductors of said matrix while electrically connecting said sets of output conductors each to a particular one of said output conductors of said programmer, whereby upon selected operation of said switch means selected sets of said output conductors of said matrix are electrically connected each to a particular one of said output conductors of said programmer to be supplied each with a predetermined voltage successively in time sequence upon operation of said programmer, and a parallel adder electrically connected to said output conductors of said matrix in a predetermined relation to be actuated thereby in response to the predetermined voltages impressed on said output conductors of said matrix to produce said equivalent number in said different radix.

5. An electric device for converting a first number of one radix to its equivalent number of a different radix comprising an electric programmer arranged to energize in sequence a plurality of output conductors thereof corresponding in number to the number of digits of said first number, an electric matrix having a plurality of output conductors dependent upon the radix of said first number and said equivalent number and the number of digits of said first number, a plurality of groups of selectively operable electric switches, each of said groups of switches comprising a number of switches corresponding to the number of possible characters of each digit of said first number, an input and an output terminal on each switch, connections for connecting said input terminals of each group of switches to an associated one of said output conductors of said programmer, a plurality of groups of buffer means each in its group electrically connecting to the output terminal of a particular one of said switches the particular output conductors of a group of said output conductors of said matrix having at least one output conductor common to another group thereof to cause said particular output conductors of said group to be supplied with a predetermined voltage from said programmer upon selected operation of said switches while at the same time electrically buffering said output conductors of different groups thereof from the output conductors of the selected group, and a parallel adder electrically connected to said output conductors of said matrix in a predetermined relation to be actuated in response to operation of said programmer and selected operation of said switches to indicate said equivalent number in said different radix.

6. An electric device for converting a first number of one radix to its equivalent number of a different radix comprising an electric programmer arranged to energize in sequence a plurality of output conductors thereof corresponding in number to the number of digits of said first number, an electric matrix having a plurality of output conductors dependent upon the radix of said first number and said equivalent number and the number of digits of said first number, a plurality of groups of selectively operable electric switches, each of said groups of switches comprising a number of switches corresponding to the number of possible characters of each digit of said first number, an input and an output terminal for each switch, connections for connecting said input terminals of each group of switches to an associated one of said output conductors of said programmer, a plurality of selected groups of neon tubes and associated resistors, each group being electrically connected to the output terminal of a particular one of said switches and to particular output conductors of said matrix to cause said particular output conductors to be supplied with a predetermined voltage from said programmer upon selected operation of said switches while at the same time electrically buffering said output conductors one from the other, and a parallel adder electrically connected to said output conductors of said matrix in a predetermined relation to be actuated in response to operation of said programmer and selected operation of said switches to indicate said equivalent number in said different radix.

ROBERT A. EDWARDS.

References Cited in the file of this patent

UNITED STATES PATENTS

| Number | Name | Date |
|---|---|---|
| 2,318,591 | Couffignal | May 11, 1943 |
| 2,411,540 | Haigh | Nov. 26, 1946 |
| 2,444,042 | Hartley | June 29, 1948 |
| 2,473,444 | Rajchman | June 14, 1949 |
| 2,521,787 | Grosdoff | Sept. 12, 1950 |
| 2,570,716 | Rochester | Oct. 9, 1951 |
| 2,574,283 | Potter | Nov. 6, 1951 |

FOREIGN PATENTS

| Number | Country | Date |
|---|---|---|
| 410,129 | Great Britain | May 9, 1934 |

OTHER REFERENCES

"Rectifier Networks for Multiposition Switching," Brown et al., Proc. I. R. E., vol. 37, No. 2, Feb. 1949, pp. 139–147.